United States Patent [19]

Chang et al.

[11] Patent Number: 4,528,333

[45] Date of Patent: Jul. 9, 1985

[54] CURABLE, IMINATED RESINS FROM AMINOPLASTS AND HYDROXYL-CONTAINING CARBOXYLIC ACIDS

[75] Inventors: Wen-Hsuan Chang; Robert Piccirilli, both of Gibsonia, Pa.

[73] Assignee: PPG Industries, Inc., Pittsburgh, Pa.

[21] Appl. No.: 594,185

[22] Filed: Mar. 28, 1984

[51] Int. Cl.$^3$ .................... C08G 6/00; C08L 61/02; C08L 67/00
[52] U.S. Cl. .................................. 525/398; 525/400; 528/266; 528/269; 528/288; 528/289
[58] Field of Search .............. 528/266, 269, 288, 289; 525/398, 400

[56] References Cited

U.S. PATENT DOCUMENTS

| | | | |
|---|---|---|---|
| 3,290,416 | 12/1966 | Christenson et al. | 260/901 |
| 3,290,417 | 12/1966 | Christenson et al. | 260/901 |
| 3,502,557 | 3/1970 | Yurcheshen et al. | 204/181 |
| 3,519,627 | 7/1970 | Coats et al. | 260/249.6 |
| 3,917,570 | 11/1975 | Chang et al. | 260/75 TN |
| 3,965,058 | 6/1976 | Yurcheshen et al. | 260/21 |
| 4,026,855 | 5/1977 | Parekh et al. | 260/29.4 UA |
| 4,403,091 | 9/1983 | Hartman et al. | 528/288 |

*Primary Examiner*—Lucille M. Phynes
*Attorney, Agent, or Firm*—Thomas M. Breininger

[57] ABSTRACT

Disclosed is an ungelled, curable, synthetic thermosetting resin, and a method of making the resin. The ungelled resin is a reaction product of components comprising: an aminoplast, a hydroxyl-containing carboxylic acid, an alkylenimine, and optionally a polyol. The disclosure is also directed to a coating composition comprising the ungelled, thermosetting resin.

19 Claims, No Drawings

CURABLE, IMINATED RESINS FROM AMINOPLASTS AND HYDROXYL-CONTAINING CARBOXYLIC ACIDS

BACKGROUND OF THE INVENTION

This invention is directed to an ungelled, curable thermosetting resin produced from an aminoplast, a hydroxyl-containing carboxylic acid, an alkylenimine, and optionally a polyol. More particularly, this invention is directed to such a thermosetting resin prepared from an alkylated melamine-aldehyde condensate, a hydroxyl-containing carboxylic acid, a low molecular weight diol, and an alkylenimine.

U.S. Pat. Nos. 3,965,058 and 3,502,557 to Yurcheshen et al disclose certain ungelled thermosetting products produced by reacting an amine-aldehyde condensate, such as a melamine-formaldehyde or urea-formaldehyde resin with a polyfunctional material containing both hydroxyl and carboxyl groups. It is disclosed that these reaction products can include other components such as a polyol or an epoxy resin, diols being preferred as are epoxides such as reaction products of epichlorohydrin and Bisphenol-A. The disclosed primary utility for the thermosetting reaction products of U.S. Pat. Nos. 3,965,058 and 3,502,557 is in water-dispersed compositions in which the vehicle comprises such reaction products alone or in combination with other resins which compositions are applied to a substrate by electrodeposition.

U.S. Pat. No. 3,519,627 to Coats is directed to cross-linking agents primarily for anionic electrodeposition compositions. The cross-linking agents are produced by introducing carboxyl groups into amino-triazine/aldehyde condensates by transetherifying an alkoxy-alkyl amino-triazine with a mono- to di-hydroxy aliphatic carboxylic acid in the presence of an acid catalyst or by etherifying an alkylol amino-triazine with a mixture of aliphatic monoalcohol and a mono- or di-hydroxy aliphatic carboxylic acid in the presence of an acid catalyst.

U.S. Pat. No. 4,026,855 to Parekh et al is directed to a coating composition primarily for use in electrodeposition containing (A) an aqueous dispersion of a mixture of an ungelled modified cross-linking agent comprising an aminoplast cross-linking agent modified by reaction with a hydroxyl-group containing carboxylic acid, and (B) a water dispersible non-gelled polymeric material of certain description, and (C) an acid solubilizer.

While the above thermosetting resins are good for certain coatings applications, they are deficient in a number of respects for use in coating formulations containing crosslinking agents based on aminoplast resins.

The present invention is directed to ungelled, thermosetting resins which not only can be used advantageously to replace at least a portion of aminoplast cross-linking agents, particularly melamine-aldehyde type condensates, in coating compositions, but also exhibit outstanding properties which make them exceptionally suitable for use as pigment dispersing resins (sometimes referred to as pigment grinding resins.) The ungelled thermosetting resins of the present invention, for example, can be used directly in place of known melamine-aldehyde crosslinking agents without the reduction of properties that can occur in both the uncured compositions and in cured films prepared therefrom when known acrylic or polyester pigment dispersing resins are employed.

An ungelled, thermosetting resin of the present invention, for example, when employed as a pigment dispersing resin, can function both as a crosslinking agent for other components of a coating composition and as a grinding resin without providing deleterious effects associated with the use of a number of known pigment dispersing resins. In addition, the ungelled, thermosetting resins of the present invention can be used in a wide variety of coatings systems since so many coating compositions depend on an aminoplast, especially a melamine-aldehyde condensate, to effect curing.

Moreover, ungelled, thermosetting resins of the present invention can be employed in coating compositions for providing elastomeric, cured films having an excellent combination of hardness and flexibility.

Especially noteworthy is that ungelled, thermosetting resins of the present invention, when employed as pigment grinding resins, provide outstanding color development and excellent transparency in the grinds even for such hard-to-grind pigments as transparent red iron oxide. Resins of the present invention also tend to provide for excellent flow out of pigmented compositions containing conductive black pigments over various primers.

Finally since ungelled, thermosetting resins of the present invention can be produced at very high solids (as will be defined infra), they can be employed in high-solids coatings applications without disadvantageously decreasing the total solids content of the coating compositions. A resin of the present invention can be employed as the major film-forming component of a thermosetting coating composition, but is especially useful for various purposes as a modifying component of thermosetting compositions.

BRIEF SUMMARY OF THE INVENTION

The present invention provides for an ungelled, synthetic thermosetting resin and a method of making an ungelled, synthetic resin which is a reaction product of components comprising: an aminoplast, a hydroxyl-containing carboxylic acid, and an alkylenimine. A preferred resin of the invention is a reaction product produced from components comprising the aforesaid components in addition to a low molecular weight polyol, especially a low molecular weight diol.

The present invention also provides for a composition useful for coating a substrate comprising an ungelled, synthetic resin of the present invention.

DETAILED DESCRIPTION OF THE INVENTION

Aminoplast resins are aldehyde condensation products of melamine, urea, and similar compounds; products obtained from the reaction of formaldehyde with melamine, urea or benzoguanamine are most common and are preferred herein. However, condensation products of other amines and also amides can also be employed, for example, aldehyde condensates of triazines, diazines, triazoles, guanadines, guanamines and alkyl- and aryl-substituted derivatives of such compounds, including alkyl- and aryl-substituted ureas and alkyl- and aryl-substituted melamines. Some examples of such compounds include methylurea, benzourea, dicyandiamide, formaguanamine, acetoguanamine, ammeline, 2-chloro-4,6-diamino-1,3,5-triazine, 6-methyl-2,4- diamino-1,3,5-triazine, 3,5-diaminotriazole, triaminopyrimidine, 2-mercapto-4,6-diaminopyrimidine, 2,4,6-triethyltriamino-1,3,5-triazine and the like.

While the aldehyde employed is most often formaldehyde, other similar condensation products can be made from other aldehydes, such as acetaldehyde, crotonaldehyde, acrolein, benzaldehyde, furfural, and others. The aminoplast resins contain methylol or similar alkylol groups, and it is preferred that at least a portion, most preferably at least 80 percent, of these alkylol groups are etherified by reaction with an alcohol to provide organic solvent-soluble resins. Any monohydric alcohol can be employed for this purpose, including such alcohols as methanol, ethanol, propanol, butanol, pentanol, hexanol, heptanol and others as well as benzyl alcohol and other aromatic alcohols, cyclic alcohols such as cyclohexanol, monoethers of glycols such as Cellosolves and Carbitols, and halogen-substituted or other substituted alcohols such as 3-chloropropanol. The preferred aminoplast resins are substantially etherified with methanol or butanol, preferably methanol, including, for example, hexamethoxymethylmelamine. Of the alkyl etherified aminoplasts it is especially preferred to employ those which are essentially monomeric compounds (i.e., essentially free of low molecular weight dimers, trimers, etc.) examples of which include those available from American Cyanamid Company as CYMEL 300 and CYMEL 1130.

The aminoplasts (sometimes referred to as amine-aldehyde condensation products) are produced in the art using acidic or basic catalysts and varying conditions of time and temperature. The aldehyde is often employed as a solution in water or alcohol, and the condensation and etherification reactions may be carried out either sequentially or simultaneously.

Various hydroxyl-containing carboxylic acids can be employed to prepare the ungelled, thermosetting resins of the invention, including such compounds as glycolic acid, beta-hydroxy propionic acid, alpha-hydroxy butyric acid, dimethylol propionic acid, mandelic acid, 2-hydroxy-3-methylbenzoic acid, 2,4,6-trihydroxybenzoic acid, ricinoleic acid, 4,4-bis(4-hydroxyphenyl)pentanoic acid, lactic acid, and other aliphatic and aromatic hydroxyl-containing carboxylic acids. Dimethylolpropionic acid, glycolic acid and lactic acid are preferred, and dimethylolpropionic acid is especially preferred.

Various alkylenimines, including substituted alkylenimines, can be used to prepare the ungelled, thermosetting reaction products of the invention. Generally, the alkylenimines used should have either two or three carbon atoms in the alkylenimine ring or rings. The preferred class of such imines are those corresponding to the formula:

$$\begin{array}{c} R^2 \quad R^6 \quad R^3 \\ | \quad | \quad | \\ R^1-C-(CH)_n-C-R^4 \\ \diagdown \quad \diagup \\ N \\ | \\ R^5 \end{array}$$

wherein $R^1$, $R^2$, $R^3$, $R^4$ and $R^5$ are each independently hydrogen; alkyl or hydroxyalkyl such as methyl, ethyl, propyl, hydroxyethyl, or the like, having for example, up to about 20 carbon atoms; aryl, such as phenyl or the like; alkaryl, such as tolyl, xylyl, or the like; or aralkyl, such as benzyl, phenethyl, or the like. $R^6$ in the above formula is hydrogen or a lower alkyl radical usually having not more than about 6 carbon atoms; and n is an integer from 0 to 1.

It is intended that the groups designated by the above formula include any substituted radicals of the classes indicated where the substituent groups do not adversely affect the basic nature of the imine in the reaction. Such substituents can include the groups such as carbonyl, cyano, halo, amino, hydroxy, alkoxy, carbalkoxy and nitrile. The substituted groups may thus be cyanoalkyl, acyl (e.g., acetyl), haloalkyl, aminoalkyl, hydroxyalkyl, alkoxyalkyl, carbalkoxyalkyl, and similar substituted derivatives of aryl, alkaryl, and aralkyl groups where present.

It will be recognized by those skilled in the art that compounds containing certain combinations of the above groups cannot be obtained, for example, because of factors such as steric hindrance or intra-molecular interaction. For this reason, in most of the compounds of the class described, several of the groups designated by $R_1$ through $R_6$ represent hydrogen. However, the efficacy of the various alkylenimines (whether or not within the above formula) does not depend upon the particular nature of any of the substituents, but rather upon the imine linkage. Thus, beneficial results are obtained with the reaction products of the aminoplasts, hydroxyl-containing carboxylic acids, and optionally polyols, which reaction products are modified by any of those compounds within the above class.

A number of specific examples of alkylenimines within the class described are as follows:
Ethylenimine(aziridine),
1,2-Propylenimine(2-methylaziridine),
1,3-Propylenimine(azetidine),
1,2-Dodecylenimine(2-decylaziridine),
1,1-Dimethyl ethylanimine(2,2-dimethylaziridine),
Phenylethylenimine(2-phenylaziridine),
Tolylethylenimine(2-(4-methylphenyl)aziridine),
Benzylethylenimine(2-phenylmethylaziridine),
1,2-Diphenylethylenimine(2,3-diphenylaziridine),
Hydroxyethylethylenimine(2-(2-hydroxyethyl)aziridine),
Aminoethylethylenimine(2-(2-aminoethyl)aziridine),
2-Methyl propylenimine(2-methylazetidine),
3-Chloropropylethylenimine(2-(3-chloropropyl)aziridine,
p-Chlorophenylethylenimine(2-(4-chlorophenyl)aziridine,
Methoxyethylethylenimine(2-2-methoxyethyl)aziridine,
Dodecylaziridinyl formate(dodecyl 1-aziridinyl formate),
Carbethoxyethylethylenimine(2-(2-carboethoxyethyl)aziridine),
N-Ethylethylenimine(1-ethylaziridine),
N-Butylethylenimine(1-butylaziridine),
N-(2-Aminoethyl)ethylenimine(1-(2-aminoethyl)aziridine),
N-(Phenethyl)ethylenimine(1-(2-phenylethyl)aziridine),
N-(2-Hydroxyethyl)ethylenimine(1-(2-hydroxyethyl)aziridine),
N-(Cyanoethyl)ethylenimine(1-cyanoethylaziridine),
N-Phenylethylenimine(1-phenylaziridine),
N-Tolylethylenimine(1-(2-methylphenyl)aziridine),
N-(p-Chlorophenyl)ethylenimine(1-(4-chlorophenyl)aziridine), and
N-(2-Carboethoxy-1-ethyl)ethylenimine(ethylaziridyl propionate).

Because of their availability and because they have been found to be among the most effective, the preferred imines are alkylenimines and substituted alkylenimines having 2 to 4 carbon atoms, and especially ethylenimine, 1,2-propylenimine, and N-hydroxyethyl ethylenimine.

In addition to the preferred class of imines, it is noted that imines not within the formula indicated may also be used. For example, satisfactory results may be attained by using alkylenimines containing more than one alkylenimine ring such as ethylene-1,2-bisaziridine and 1,2,4-tris(2-1-aziridinylethyl)trimellitate. Similarly, alkylenimines, such as N-aminoethylenimine and the like, can be used. It is to be understood that the term, alkylenimines, as that term is used in the instant invention includes all the above-described alkylenimines, both substituted and otherwise.

In addition to the aminoplast, hydroxyl-containing carboxylic acid, and alkylenimine, the ungelled thermosetting resins of the invention can be prepared employing polyols, especially diols, to make the reaction product and incorporation of such polyols is preferred. Examples of such polyols include, but are not limited to, simple diols and higher hydric alcohols, polyester polyols, and polyether polyols.

Examples of the simple diols and higher hydric alcohols include ethylene glycol, propylene glycol, 1,4-butanediol, 1,3-butanediol, 1,5-pentanediol, 1,6-hexanediol, 2,5-hexanediol, 2-methyl-1, 3-pentanediol, 2-ethyl-1,3-hexanediol, 2,2-dimethyl-1,3-propanediol, 2,2,4-trimethyl-1,3-pentanediol, 1,4-cyclohexanediol, 1,4-cyclohexanedimethylol, 1,2-bis(hydroxymethyl)cyclohexane, 1,2-bis(hydroxyethyl)cyclohexane, trimethylolpropane, 2,2-dimethyl-3-hydroxypropyl-2,2-dimethyl-3-hydroxypropionate, diethylene glycol, trimethylene glycol, dipropylene glycol, tetraethylene glycol, bisphenol-A, hydrogenated bisphenol-A, trimethylolethane, glycerol, sorbitol, sucrose, and mixtures thereof.

Polyester polyols which may be employed in the preparation of the ungelled thermosetting resins of the invention include the generally known polyester polyols prepared by conventional techniques utilizing simple diols and higher hydric alcohols known in the art (optionally in combination with monohydric alcohols) with polycarboxylic acids. Examples of the simple diols and higher hydric alcohols include those described previously herein. Additional examples include the alkoxylation product of one mole of 2,2-bis(4-hydroxyphenyl)propane (i.e., bisphenol-A) and 2 moles of propylene oxide available as DOW-565 from Dow Chemical Company, and the like; the polyether glycols such as poly(oxypropylene)glycol and poly(oxytetramethylene)glycol; pentaerythritol; caprolactone triol (e.g. the reaction product of caprolactone and trimethylolpropane) and the like. Examples of suitable polycarboxylic acids include: phthalic acid; isophthalic acid; terephthalic acid; trimellitic acid; adipic acid; azelaic acid; sebacic acid; succinic acid; malic acid; glutaric acid; malonic acid; pimelic acid; suberic acid; 2,2-dimethylsuccinic acid; 3,3-dimethylglutaric acid; 2,2-dimethylglutaric acid; maleic acid; fumaric acid; itaconic acid; and the like. Anhydrides of the above acids, where they exist, can also be employed and are encompassed by the term "polycarboxylic acid." In addition, certain compounds which react in a manner similar to acids to form polyester polyols are also useful. Such materials include lactones such as caprolactone, propylolactone, and methyl caprolactone, and hydroxy acids such as hydroxy caproic acid and dimethylolpropionic acid. If a triol or other higher hydric alcohol is used, a monocarboxylic acid, such as acetic acid and benzoic acid, may be used in the preparation of the polyester polyol. Moreover the polyester polyols include polyester polyols modified with fatty acids or glyceride oils of fatty acids (i.e., conventional alkyd polyols containing such modification). Other suitable polyester polyols may be prepared by reacting an alkylene oxide such as ethylene oxide, propylene oxide, butylglycidyl ether, and the glycidyl ethers of organic acids such as CARDURA-E, with the carboxylic acid to form the corresponding ester. Examples of the optional monohydric alcohols which may be used to prepare the polyester polyols include: ethanol; propanol; isopropanol; n-pentanol; neopentyl alcohol; 2-ethoxyethanol; 2-methoxyethanol; 1-hexanol; cyclohexanol; 2-methyl-2-hexanol; 2-ethylhexyl alcohol; 1-octanol; 1-nonanol; isodecyl alcohol; and the like.

Examples of polyether polyols which may be employed to prepare the ungelled thermosetting resins of the invention include the generally known polyether polyols prepared by well known techniques. Examples of polyether polyols include the poly(oxyalkylene)glycols prepared by the acid or base catalyzed addition of an alkylene oxide such as ethylene oxide and/or propylene oxide to initiator compounds such as ethylene glycol, propylene glycol, diethylene glycol, dipropylene glycol, trimethylolpropane, glycerol, pentaerythritol, sorbitol, sucrose and the like. Additional examples of polyether polyols include the generally known poly(oxytetramethylene)glycols prepared by the polymerization of tetrahydrofuran in the presence of Lewis acid catalysts such as boron trifluoride, tin (IV) chloride, antimony pentachloride, antimony trichloride, phosphorous pentafluoride, and sulfonyl chloride. Other examples of polyether polyols include the generally known reaction products of 1,2-epoxide-containing compounds with polyols such as those included in the description of simple diols and higher hydric alcohols above.

Low molecular weight polyols are preferred for making the resins of the invention, i.e., polyols having a molecular weight ranging from about 62 to about 500.

Preparation of the ungelled, thermosetting reaction products may be carried out by reacting the aminoplast, hydroxyl-containing carboxylic acid, optional polyol, and alkylenimine together in a single step. However it is preferred to first react the aminoplast, hydroxyl-containing carboxylic acid and optional polyol together with removal of the resulting lower alcohol by distillation to form a prereaction product containing carboxyl groups followed by imination of the prereaction product to form an ungelled thermosetting resin of the invention. The aminoplast, hydroxyl-containing carboxylic acid and optional polyol generally are mixed together and reacted by heating to a temperature of up to about 200° C., typically up to about 120° C. while removing the lower alcohol product by distillation. The progress of the reaction can conveniently be followed by the increase in viscosity of the reaction mixture as the reaction proceeds. The reaction can be stopped merely by cooling when the desired extent of reaction is obtained. Preferred reaction products of the invention for use as grinding resins are prepared by allowing the reaction to proceed until a Gardner-Holdt viscosity of about U to V is obtained for the reaction product at a total theoretical solids content in methylisobutyl ketone of at least about 80 percent by weight. The preferred reaction products for use as grinding resins, prior to imination have an acid value at 100 percent theoretical solids of less than about 13. Following imination, the preferred reaction products for use as grinding resins, have an acid value of less than about 9 at a theoretical total solids content in isobutanol of 80 percent by weight. Of course, depending on such factors as the relative amounts of aminoplast, hydroxyl-containing carboxylic acid, polyol, and alkylenimine and the desired reaction conditions of time and temperature, for preparation of ungelled thermosetting resins of the invention designed to meet various purposes, the acid value of the resulting iminated reaction products may vary widely. However, generally the reaction products of the invention have acid values at about 80 percent by weight total solids in isobutanol ranging up to about 80, preferably up to about 50, and more preferably up to about 30.

The proportions of aminoplast, hydroxyl-containing carboxylic acid, and optional polyol in the ungelled thermosetting resins of the invention can be varied widely. However generally the resins of the invention are prepared from about 98 to about 50 percent by weight of aminoplast, from about 2 to about 20 percent by weight of hydroxyl-containing carboxylic acid, and from 0 to about 12 percent by weight of polyol based on the total weight of the aforesaid three components. Provided that at least some imine-modification is attained, advantages of the invention are achieved when all or part of the acidic groups present are reacted with the alkylenimine, the extent of the modification being dependent upon the amount of imine employed. In order to attain the beneficial results from the imine-modification, it is necessary that at least 0.1 percent by weight of the imine based on the total weight of the ungelled thermosetting resin be used. In general, the ratio of weight of imine to the weight of resin can vary from about 0.1 to about 5 percent, preferably from about 0.5 to about 2.0 percent.

The reaction with the alkylenimine can be performed by admixing the imine with the other components for preparing a resin of the invention and heating to a moderate temperature, for example from about 25° C. to about 150° C., although higher or lower temperature may be used depending upon the desired reaction time. In the preferred method for preparing a resin of the invention the aminoplast, hydroxyl-containing carboxylic acid and optional polyol are first reacted together by heating to a temperature of about 80° C. to about 150° C. to form a prereaction product. Thereafter, the alkylenimine is admixed with the prereaction product and the resultant composition is heated to a temperature of about 40° C. to about 100° C. The imine reacts with the acidic groups, but the exact nature of the reaction which takes place under these circumstances and the structure of the product obtained is not known with certainty.

While the ungelled, thermosetting resins of the invention may themselves be utilized as coating compositions, it is preferred that they be combined with additional components such as other film-forming thermosetting and/or thermoplastic resins, most preferably with other thermosetting resins. Examples of such additional film-forming thermosetting and/or thermoplastic resins include the generally known cellulosics, acrylics, aminoplasts, urethanes, polyesters, polyethers, polyamides, epoxies or mixtures thereof. The thermosetting resins of the invention and the optional, additional film-forming resins can be employed optionally in combination with various ingredients generally known for use in coating compositions. Examples of these various ingredients include: fillers; plasticizers; antioxidants; mildewcides and fungicides; surfactants; various flow control agents including, for example, thixotropes and also additives for sag resistance and/or pigment orientation based on polymer microparticles (sometimes referred to as microgels) described for example in U.S. Pat. Nos. 4,025,474; 4,055,607; 4,075,141; 4,115,472; 4,147,688; 4,180,489; 4,242,384; 4,268,547; 4,220,679; and 4,290,932.

Cellulosics refer to the generally known thermoplastic polymers which are derivatives of cellulose, examples of which include: nitrocellulose; organic esters and mixed esters of cellulose such as cellulose acetate, cellulose propionate, cellulose butyrate, and preferably cellulose acetate butyrate (CAB); and organic ethers of cellulose such as ethyl cellulose.

Acrylic resins refer to the generally known addition polymers and copolymers of acrylic and methacrylic acids and their ester derivatives, acrylamide and methacrylamide, and acrylonitrile and methacrylonitrile. Additional examples of acrylic monomers which can be addition polymerized to form acrylic resins which may be used in compositions of the invention include methyl acrylate, ethyl acrylate, isopropyl acrylate, butyl acrylate, t-butyl acrylate, 2-ethylhexyl acrylate, cyclohexyl acrylate, 3,3,5-trimethylcyclohexyl acrylate, methyl methacrylate, ethyl methacrylate, isopropyl methacrylate, butyl methacrylate, t-butyl methacrylate, n-hexyl methacrylate, decyl methacrylate, isodecyl methacrylate, lauryl methacrylate, stearyl methacrylate, phenyl methacrylate, cyclohexyl methacrylate, isobornyl methacrylate, 2-hydroxyethyl methacrylate, hydroxypropyl methacrylate, glycidyl methacrylate, dimethylaminoethyl methacrylate, and t-butylaminoethyl methacrylate. Moreover, where desired, various other unsaturated monomers can be employed in the preparation of acrylic resins for compositions of the invention examples of which include: vinyl aromatic hydrocarbons such as styrene, alpha methyl styrene, and vinyl toluene; vinyl acetate; vinyl chloride; and the like.

Aminoplast resins refer to the generally known condensation products of an aldehyde with an amino- or amido-group containing substance examples of which include the reaction products of formaldehyde, acetaldehyde, crotonaldehyde, benzaldehyde and mixtures thereof with urea, melamine, or benzoguanimine. Preferred aminoplast resins include the etherified products obtained from the reaction of alcohols and formaldehyde with urea, melamine, or benzoguanimine. Examples of suitable alcohols for preparing these etherified products include: methanol, ethanol, propanol, butanol, hexanol, benzylalcohol, cyclohexanol, 3-chloropropanol, and ethoxyethanol. Additional examples of aminoplast resins include those described previously herein as examples of aminoplasts for preparing resins of the present invention.

Urethane resins refer to the generally known thermosetting or thermoplastic urethane resins prepared from organic polyisocyanates and organic compounds containing active hydrogen atoms as found for example in hydroxyl, and amino moieties. Some examples of urethane resins typically utilized in one-pack coating compositions include: the isocyanate-modified alkyd resins sometimes referred to as "uralkyds"; the isocyanate-modified drying oils commonly referred to as "urethane oils" which cure with a drier in the presence of oxygen in air; and isocyanate-terminated prepolymers typically prepared from an excess of one or more organic polyisocyanates and one or more polyols including, for example, simple diols, triols and higher alcohols, polyester polyols and polyether polyols. Some examples of systems based on urethane resins typically utilized as two-pack coating compositions include an organic polyisocyanate or isocyanate-terminated prepolymer (first pack) in combination with a substance (second pack) containing active hydrogen as in hydroxyl or amino groups along with a catalyst (e.g., an organotin salt such as dibutyltin dilaurate or an organic amine such as triethylamine or 1,4-diazobicyclo-(2:2:2)octane). The active hydrogen-containing substance in the second pack typically is a polyester polyol, a polyether polyol or an acrylic polyol known for use in such two-pack urethane resin systems. Many coating compositions based on urethanes (and their preparation) are described extensively in Chapter X Coatings, pages 453–607 of *Polyurethanes: Chemistry and Technology, Part II* by H. Saunders and K. C. Frisch, Interscience Publishers (N.Y., 1964).

Polyester resins are generally known and are prepared by conventional techniques utilizing polyhydric alcohols and polycarboxylic acids. Examples of suitable polyhydric alcohols include: ethylene glycol; propylene glycol; diethylene glycol; dipropylene glycol; butylene glycol; glycerol; trimethylolpropane; pentaerythritol; sorbitol; 1,6-hexanediol; 1,4-cyclohexanediol; 1,4-cyclohexanedimethanol; 1,2-bis(hydroxyethyl)cyclohexane; and 2,2-dimethyl-3-hydroxypropyl-2,2-dimethyl-3-hydroxypropionate. Examples of suitable polycarboxylic acids include: phthalic acid; isophthalic acid; terephthalic acid; trimellitic acid; tetrahydrophthalic acid; hexahydrophthalic acid; tetrachlorophthalic acid; adipic acid; azelaic acid; sebacic acid; succinic acid; maleic acid; glutaric acid; malonic acid; pimelic acid; suberic acid; 2-2-dimethylsuccinic acid; 3,3-dimethylglutaric acid; 2,2-dimethylglutaric acid; maleic acid; fumaric acid; and itaconic acid. Anhydrides of the above acids, where they exist, can also be employed and are encompassed by the term "polycarboxylic acid." In addition, certain substances which react in a manner similar to acids to form polyesters are also useful. Such substances include lactones such as caprolactone, propylolactone and methyl caprolactone, and hydroxy acids such as hydroxy caproic acid and dimethylol propionic acid. If a triol or higher hydric alcohol is used, a monocarboxylic acid, such as acetic acid and benzoic acid may be used in the preparation of the polyester resin. Moreover, polyesters which may be used in compositions of the invention are intended to include polyesters modified with fatty acids or glyceride oils of fatty acids (i.e., conventional alkyd resins). Alkyd resins typically are produced by reacting the polyhydric alcohols, polycarboxylic acids, and fatty acids derived from drying, semi-drying, and non-drying oils in various proportions in the presence of a catalyst such as litharge, sulfuric acid, or a sulfonic acid to effect esterification. Examples of suitable fatty acids include saturated and unsaturated acids such as stearic acid, oleic acid, ricinoleic acid, palmitic acid, linoleic acid, linolenic acid, licanic acid, eleostearic acid, and clupanodonic acid.

Epoxy resins, often referred to simply as "epoxies", are generally known and refer to compounds or mixtures of compounds containing more than one 1,2-epoxy group of the formula

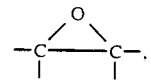

i.e., polyepoxides. The polyepoxides may be saturated or unsaturated, aliphatic, cycloaliphatic, aromatic or heterocyclic. Examples of suitable polyepoxides include the generally known polyglycidyl ethers of polyphenols and/or polyepoxides which are acrylic resins containing pendant and/or terminal 1,2-epoxy groups. Polyglycidyl ethers of polyphenols may be prepared, for example, by etherification of a polyphenol with epichlorohydrin or dichlorohydrin in the presence of an alkali. Examples of suitable polyphenols include: 1,1-bis(4-hydroxyphenyl)ethane; 2,2-bis(4-hydroxyphenyl)propane; 1,1-bis-(4-hydroxyphenyl)isobutane; 2,2-bis(4-hydroxytertiarybutylphenyl)propane; bis(2-hydroxynaphthyl)methane; 1,5-dihydroxynaphthalene; 1,1-bis(4-hydroxy-3-allylphenyl)ethane; and the hydrogenated derivatives thereof. The polyglycidyl ethers of polyphenols of various molecular weights may be produced, for example, by varying the mole ratio of epichlorohydrin to polyphenol in known manner.

Epoxy resins also include the polyglycidyl ethers of mononuclear polyhydric phenols such as the polyglycidyl ethers of resorcinol, pyrogallol, hydroquinone, and pyrocatechol.

Epoxy resins also include the polyglycidyl ethers of polyhydric alcohols such as the reaction products of epichlorohydrin or dichlorohydrin with aliphatic and cycloaliphatic compounds containing from two to four hydroxyl groups including, for example, ethylene glycol, diethylene glycol, triethylene glycol, dipropylene glycol, tripropylene glycol, propane diols, butane diols, pentane diols, glycerol, 1,2,6-hexanetriol, pentaerythritol, and 2,2-bis(4-hydroxycyclohexyl)propane.

Epoxy resins additionally include polyglycidyl esters of polycarboxylic acids such as the generally known polyglycidyl esters of adipic acid, phthalic acid, and the like.

Addition polymerized resins containing epoxy groups may also be employed. These polyepoxides may be produced by the addition polymerization of epoxy functional monomers such as glycidyl acrylate, glycidyl methacrylate and allyl glycidyl ether optionally in combination with ethylenically unsaturated monomers such as styrene, alpha-methyl styrene, alpha-ethyl styrene, vinyl toluene, t-butyl styrene, acrylamide, methacrylamide, acrylonitrile, methacrylonitrile, ethacrylonitrile, ethyl methacrylate, methyl methacrylate, isopropyl methacrylate, isobutyl methacrylate, and isobornyl methacrylate.

Many additional examples of epoxy resins are described in the *Handbook of Epoxy Resins*, Henry Lee and Kris Neville, 1967, McGraw Hill Book Company.

As discussed previously, the ungelled, thermosetting resins of the invention provide a number of advantages in pigmented coating compositions and are especially suitable as pigment dispersing resins. Pigments suitable for coating compositions containing ungelled, thermosetting resins of the invention include a wide variety of pigments known for use in coating compositions. Suitable pigments include both metallic-flake pigments and various white and colored pigments. Examples of pigments include titanium dioxide, magnesium carbonate, dolomite, zinc oxide, magnesium oxide, iron oxides red, black or yellow, barium yellow, carbon black, strontium chromate, lead chromate, molybdate red, chromoxide green, cobalt blue, organic pigments of the azo series, aluminum flakes, nickel flakes, tin flakes, silver flakes, chromium flakes, stainless steel flakes, gold flakes, copper flakes and combinations thereof.

Coating compositions utilizing the ungelled, thermosetting resins of the invention may be applied to a wide variety of substrates such as wood, metals, glass, cloth, plastics, foams and the like. The coating compositions can be applied to the substrate utilizing any known application technique including, for example, spraying, brushing, roll coating, doctor blade coating, curtain coating, and the like. Coating compositions containing ungelled, thermosetting resins of the invention typically are cured by heating at temperatures ranging from about 80° C. to about 175° C. Curing times for coating compositions based on thermosetting resins may be subject to wide variation but typically are in the range of from about 10 minutes to about 45 minutes.

The examples which follow are submitted for the purpose of further illustrating the nature of the present invention and should not be regarded as a limitation on the scope thereof.

As used in the body of the specification, examples, and claims, all percents, ratios and parts are by weight unless otherwise specifically indicated.

EXAMPLE 1

A reaction vessel equipped with a mechanical stirrer, heating mantle, addition funnel, pot thermometer, and distillation take-off head containing a thermometer, and a condenser is charged with 14581.0 grams (g) of hexamethoxymethyl melamine (available as CYMEL-300 from American Cyanamid Company), 1532.0 g of 1,6-hexanediol, and 765.0 g of dimethylolpropionic acid (DMPA).

The contents of the vessel are stirred and heated while a distillate containing methanol is collected according to the time, temperature, and distillation schedule as set forth in the following TABLE 1.

TABLE 1

| Total Elapsed Time (hours & minutes) | Pot Temperature (°C.) | Head Temperature (°C.) | Cumulative Amount of Distillate Collected (milliliters) |
|---|---|---|---|
| 0 | — | — | — |
| 32 min. | 100 | RT[1] | 0 |
| 35 min. | 105 | RT | 0 |
| 54 min. | 120 | 53 | Distillate begins to come off |
| 1 hr. 40 min. | 121 | 68 | 380 |
| 2 hr. | 120 | 66 | 500 |
| 3 hr. 17 min. | 120 | 64 | 780 |
| 4 hr. 24 min. | 120 | 60 | 910 |
| 4 hr. 36 min. | 122 | 61 | 932 |
| 4 hr. 55 min. | 122 | 56 | 955 |
| 5 hr. | 122 | 55 | 965 |
| 5 hr. 26 min[2] | 122 | 55 | 990 |
| 0[3] | 30 | RT | Not measured |
| 1 hr. 11 min. | 105 | RT | Not measured |
| 1 hr. 31 min. | 121 | 56 | 1030 |
| 3 hr. 59 min. | 120 | 44 | 1120 |
| 6 hr. 6 min. | 120 | 45 | 1164 |
| 6 hr. 28 min. | 120 | 45 | 1170 |
| 6 hr. 40 min[4] | 113 | 36 | 1172 |
| 7 hr. 26 min[5] | 95 | Not measured | |
| 7 hr. 56 min[6] | 64 | Not measured | |
| 9 hr. 56 min[7] | 60 | | |

[1]Room Temperature.
[2]Heating is discontinued and the contents of the vessel are allowed to cool overnight.
[3]Heating is resumed at a time when the pot temperature is 30° C.
[4]Heating is discontinued.
[5]At this point, 3967 g of isobutanol is added to the contents of the vessel to give a theoretical total solids content of 80 percent by weight. The acid value at this point is 9.34.
[6]At this point, 126.9 g of hydroxyethylethylenimine (HEEI) is added to the contents of the vessel and heating is resumed so as to maintain the pot temperature between 64° C. and 60° C.
[7]Heating is discontinued and the contents of the flask are allowed to cool.

The resulting reaction product is a resin of the invention. The reaction product has an acid value of 6.0, a Gardner-Holdt viscosity of X-Y, a total solids content measured for 2 hours at 105° C. of 77.4 percent by weight, a total solids content measured for 2 hours at 150° C. of 64.3 percent by weight, a color value of 1–2, a hydroxyl number of 25.8, and a free HEEI content of 28 parts per million by weight.

EXAMPLE 2

(a) A reaction vessel equipped as described in Example 1 is charged with 1560.0 g of hexamethoxymethyl melamine (CYMEL-300) and 268.0 g of dimethylolpropionic acid.

The contents of the vessel are stirred and heated while a distillate containing methanol is collected according to the schedule as set forth in the following TABLE 2.

TABLE 2

| Total Elapsed Time (minutes) | Pot Temperature (°C.) | Head Temperature (°C.) | Cumulative Amount of Distillate Collected (ml) |
|---|---|---|---|
| 0 | — | — | — |
| 38 | 110 | RT[1] | — |
| 46 | 120 | 65 | 20 |
| 53 | 120 | 64 | 48 |
| 65 | 100 | RT | 55 |

[1]Room temperature

A total of 55 ml of distillate is collected. The resulting product has an acid value of 46.7 and a Gardner-Holdt viscosity of L-M.

(b) A total of 1338 g of the product of part (a) immediately above is removed from the reaction vessel and to the remaining product in the vessel is added 4.8 g of hydroxyethylethylenimine. Next, the contents of the vessel are heated at about 60° C. for 2½ hours. The resulting product is a resin of the invention having an acid value of 35.3.

(c) A reaction vessel equipped as described in Example 1 is charged with 595 g of the product having an acid value of 46.7 as described in part (a) of this Example. The contents of the vessel are stirred and heated while a distillate containing methanol is collected according to the schedule as set forth in the following TABLE 3.

TABLE 3

| Total Elapsed Time (minutes) | Pot Temperature (°C.) | Head Temperature (°C.) | Cumulative Amount of Distillate Collected (ml) |
|---|---|---|---|
| 0 | RT[1] | — | — |
| 20 | 120 | 62 | — |
| 31 | 120 | 60 | 10 |
| 38 | 119 | 45 | 13 |

[1] Room temperature

A total of 13 ml of distillate is collected.

To 568 g of the resulting product is added 142 g of isobutanol to give a total calculated solids content of 80 percent by weight.

To 560 g of the product having a calculated solids content of 80 percent by weight is added 3.6 g of hydroxyethylethylenimine, and the resulting composition is heated at about 60° C. for 3 hours to produce a resin of the invention having an acid value of 31.6.

EXAMPLE 3

(a) A resin of the invention is prepared from 85.71 parts by weight (pbw) of CYMEL-300, 9.00 pbw of 1,6-hexanediol, 4.50 pbw of DMPA, 0.79 pbw of HEEI, and about 23.3 pbw of isobutanol according to a procedure similar to that described in EXAMPLE 1.

The resulting reaction product has an acid value of 6.2 and a hydroxyl value of 27.0.

(b) To a 5 fluid ounce stainless steel Jiffy Mill (from Paul M. Gardner) containing steel shot of about 3 millimeters in average diameter, is added 16 pbw of the reaction product of part (a) immediately above, 26.5 pbw of a mixture of xylene and butyl alcohol (in a 1:1 ratio by volume), and 7.5 pbw of transparent iron oxide red pigment (available as Red 288 VN from BASF Wyandotte). Next, the contents of the Jiffy Mill are agitated by shaking the Jiffy Mill for 2½ hours on a conventional paint shaking apparatus (i.e., a conventional type of apparatus for mixing paints). Next, the steel shot is separated from the resulting pigment dispersion (commonly referred to as a "pigment grind").

A sample of the resulting pigment dispersion is drawn down on a glass panel by means of a 3 mil drawdown bar to produce a wet film of the pigment dispersion on the glass panel. The wet film is visually examined by looking through the film into a lighted background and examined for "color development" and "transparency". The wet film exhibits excellent color development in that the film is of a uniform, rich red color. The wet film exhibits excellent transparency, meaning that printed matter can be read easily as viewed through the wet film on the glass plate.

What is claimed is:

1. An ungelled synthetic resin which is a reaction product of components comprising: an aminoplast resin, a hydroxyl-containing carboxylic acid, and an alkylenimine.

2. The resin of claim 1 wherein said aminoplast is selected from the group consisting of a melamine-aldehyde condensation product, a urea-aldehyde condensation product, and a mixture thereof.

3. The resin of claim 1 wherein said aminoplast resin is an alkylated melamine-aldehyde condensation product.

4. The resin of claim 1 wherein said alkylenimine corresponds to the formula $$R^1-\underset{\underset{\underset{R^5}{|}}{N}}{\overset{R^2}{\overset{|}{C}}}-(CH)_n-\overset{R^3}{\overset{|}{\underset{|}{C}}}-R^4$$

wherein $R^1$, $R^2$, $R^3$, $R^4$ and $R^5$ are each independently selected from the group consisting of hydrogen, alkyl, aryl, alkaryl, hydroxyalkyl, and aralkyl, $R^6$ is selected from the group consisting of hydrogen and lower alkyl, and n is an integer of from 0 to 1.

5. The resin of claim 4 wherein said alkylenimine is selected from the group consisting of ethylenimine, 1,2-propylenimine, N-hydroxyethylethylenimine, and a mixture thereof.

6. The resin of claim 1 wherein said hydroxyl-containing carboxylic acid is selected from the group consisting of dimethylol propionic acid, glycolic acid, lactic acid, and mixtures thereof.

7. The resin of claim 1 wherein said hydroxyl-containing carboxylic acid comprises dimethylolpropionic acid.

8. The ungelled synthetic resin of claim 1 which is the reaction product of said components additionally comprising a polyol.

9. The ungelled synthetic resin of claim 8 wherein said polyol comprises a diol having a molecular weight ranging from 62 to about 500.

10. A method for preparing an ungelled synthetic resin comprising:
   (a) reacting an aminoplast resin, a hydroxyl-containing carboxylic acid, and optionally a polyol to form a reaction product, and thereafter
   (b) reacting the reaction product from step (a) with an alkylenimine.

11. The method of claim 10 wherein said aminoplast resin is selected from a melamine-aldehyde condensation product, a urea-aldehyde condensation product, and a mixture thereof.

12. The method of claim 10 wherein said aminoplast resin is an alkylated melamine-aldehyde condensation product.

13. The method of claim 10 wherein said alkylenimine corresponds to the formula $$R^1-\underset{\underset{\underset{R^5}{|}}{N}}{\overset{R^2}{\overset{|}{C}}}-(CH)_n-\overset{R^3}{\overset{|}{\underset{|}{C}}}-R^4$$

wherein $R^1$, $R^2$, $R^3$, $R^4$, and $R^5$ are each independently selected from the group consisting of hydrogen, alkyl, aryl, alkaryl, hydroxyalkyl, and aralkyl, $R^6$ is selected from the group consisting of hydrogen and lower alkyl, and n is an integer of from 0 to 1.

14. The method of claim 13 wherein said alkylenimine is selected from the group consisting of ethylenimine, 1,2-propylenimine, N-hydroxyethylethylenimine, and a mixture thereof.

15. The method of claim 10 wherein said hydroxyl-containing carboxylic acid comprises dimethylol propionic acid.

16. The method of claim 10 wherein step (a) consists of reacting an aminoplast resin, a hydroxyl-containing carboxylic acid, and a polyol having a molecular weight ranging from 62 to about 500.

17. A composition useful for coating a substrate comprising: an ungelled synthetic resin which is a reaction product of components comprising an aminoplast resin, a hydroxyl-containing carboxylic acid, and an alkylenimine; and a film-forming resin.

18. The composition of claim 17 wherein said film-forming resin is a thermosetting resin.

19. A substrate having a cured film of the composition of claim 17 adhered thereto.

* * * * *